United States Patent [19]
Raistrick et al.

[11] Patent Number: 5,971,279
[45] Date of Patent: Oct. 26, 1999

[54] HAND HELD SCANNER FOR THE VISUALLY IMPAIRED

[75] Inventors: David B. Raistrick, Peoria; Philip C. Raistrick, Normal, both of Ill.

[73] Assignee: En-Vision America, Inc., Normal, Ill.

[21] Appl. No.: 08/770,187

[22] Filed: Dec. 19, 1996

[51] Int. Cl.⁶ .................................................. G06K 7/10
[52] U.S. Cl. ............................ 235/472.01; 235/462.45
[58] Field of Search ........................... 235/472.01, 462.45

[56] References Cited

U.S. PATENT DOCUMENTS

| | | |
|---|---|---|
| 3,874,097 | 4/1975 | Mauch . |
| 4,000,565 | 1/1977 | Overby . |
| 4,766,529 | 8/1988 | Nakano . |
| 4,793,812 | 12/1988 | Sussman . |
| 5,306,152 | 4/1994 | Shimoda . |
| 5,399,844 | 3/1995 | Holland . |
| 5,401,944 | 3/1995 | Bravman . |
| 5,698,834 | 12/1997 | Worthington et al. ............. 235/472 |

*Primary Examiner*—Harold I. Pitts
*Attorney, Agent, or Firm*—Knechtel, Demeur & Samlan

[57] ABSTRACT

A hand held scanner having recording capabilities is provided. The invention comprises a scanner which reads bar codes, converts the codes to electrical signals, which are then relayed to a palm size data processing unit. The data processing unit contains signal synthesizing, memory, recording, playback and erasure means. The device has six operating modes: the identification or I.D. mode during which scanning takes place and an audible output is generated; memo mode during which data (some of which may not relate to a particular object) may be input into, deleted from or replayed by the device; search mode during which a sequentially audible listing of recorded information is played back; memory mode during which the amount of remaining available memory is audibly displayed; date/time mode during which the current day and time are audibly displayed; and help mode which contains a brief overview of the device's functions. A record button permits verbal input during the I.D. mode and memo mode. An erase button deletes voice input data during the I.D., search, and memo modes. The previous and next buttons move to the desired message during the search and memo modes. A removable flash memory stores recorded information, and a speaker, microphone, headphone jack, and on/off and volume control systems are also provided.

15 Claims, 3 Drawing Sheets

HAND HELD SCANNER FOR THE VISUALLY IMPAIRED

FIELD OF INVENTION

This invention relates generally to scanning devices and, more particularly, to a hand held bar code scanning device having digital voice recording capabilities to assist in identifying visually imperceptible objects.

BACKGROUND OF THE INVENTION

There are an array of products on the market to assist visually impaired persons accomplish various tasks. For example, U.S. Pat. No. 5,306,152, 4,000,565, and 3,874,097, teach devices which assist the visually impaired in reading. Before the present invention, however, there has been no device which conveniently assists the visually impaired to identify objects, such as clothing, cans, boxes or bottles of food or drink, medicines, compact discs or a host of other useful items. To accomplish this, the visually impaired heretofore had to rely upon sighted individuals, thereby decreasing their independence and increasing the time it takes to accomplish certain tasks.

The present invention permits a visually impaired individual to identify objects using a hand held bar code scanner having recording capabilities. Heretofore, scanning devices which recognized bar codes, i.e. UPC, or universal pricing codes, have been widely used in business. They are seen in stores to identify the price of goods, in the shipping industry to track goods, in general industry for inventory control, and elsewhere. Typically, these devices consist of a sensing device electronically connected to a receiving device which has information pre-coded into it. These devices allow the user to identify a particular object which has already received a bar code imprint. They do not, however, permit the user the option of entering or deleting data from the system.

There is need, therefore, for a convenient, easy to use, hand held device which provides the visually impaired with the means to use existing UPC bar codes, or to apply new bar codes to objects, scan them, record information regarding a particular object for later retrieval and delete unwanted information.

SUMMARY OF THE INVENTION

The above needs are met in a hand held scanner having recording capabilities. According to the invention, a scanner reads a bar code, converts it to an electrical signal, which is then relayed to a palm size data processing unit. The data processing unit contains signal synthesizing memory, recording means, playback means and erasure means. The device has six operating modes: the Identification or I.D. mode during which scanning takes place and an audible output is generated; the Memo mode during which data (some of which may not relate to a particular object) may be input into, deleted from or replayed by the device; the Search mode during which a sequentially audible listing of recorded information is played back; the Memory mode during which the amount of remaining available memory is audibly displayed; the Date/Time mode during which the current day and time are audibly displayed; and the Help mode which contains a brief overview of the device's functions.

A Mode button selects the mode of operation of the device. A Record button permits verbal input during the I.D. mode and Memo mode. An Erase button deletes voice input data during the I.D., Search, and Memo modes. A Previous button moves to the previous message during the Search and Memo modes, and a Next button moves to the next message during the Search and Memo modes. A removable flash memory stores recorded information, and a speaker, microphone, headphone jack, and on/off and volume control systems are also provided.

In the operation of the device, the visually impaired individual must first locate a bar code on the item to be identified. Many objects are already imprinted with standard bar codes and these may be used or new bar code labels may be created for objects which are not so imprinted. A problem with locating the bar code imprint is that it is usually two dimensional and is not easily located by a visually impaired person. One solution is to place a raised symbol in the Braille system in a predetermined position with respect to the bar code imprint. Alternatively, a bar code imprint having depth which can be tactilely perceived by the user could be affixed to the object.

When the device is powered up, it will normally be in the I.D. mode. The device is then capable of reading a bar code. The first time a particular bar code is scanned, no match will be found in the device's memory and the user will be audibly prompted to record a variable length description of the object which the device then associates with a particular bar code. The next time the same bar code is scanned, the bar code will be recognized and the stored description is played through an output speaker. The Erase mode is used to selectively delete unwanted information regarding a particular object and bar code. The device also permits the user to record, play and erase memos not associated with bar codes by using the Memo mode.

Also provided are: a Search mode which allows the user to sequentially review all stored I.D. or bar code messages in its memory; a Memory mode which reports to the user the amount of memory minutes that remain on the current flash memory; a Date/Time mode which reports to the user the current date and time, and; a Help mode which contains a recording that describes the basic functions of the device.

OBJECTS OF THE INVENTION

It is an object of the present invention to provide a convenient, easy to use device to assist the visually impaired in identifying objects.

It is another object of the present invention to provide such a device in a hand held bar code scanner having information recording capabilities.

It is yet another object of the present invention to provide such a device in which additional memory is provided for recording messages not associated with a particular object or bar code.

It is yet a further object of the present invention to provide a device which allows the user the ability to delete information regarding a particular object or bar code, or a message.

It is yet a further object of the present invention to provide a device which allows the user to sequentially scan either backwards or forward through recorded information.

It is yet another object of the present invention to provide a device which contains removable flash memory cards, thereby allowing the user an unlimited amount of memory to record data.

DETAILED DESCRIPTION OF THE PREFERRED EMBODIMENT

Figure 1:
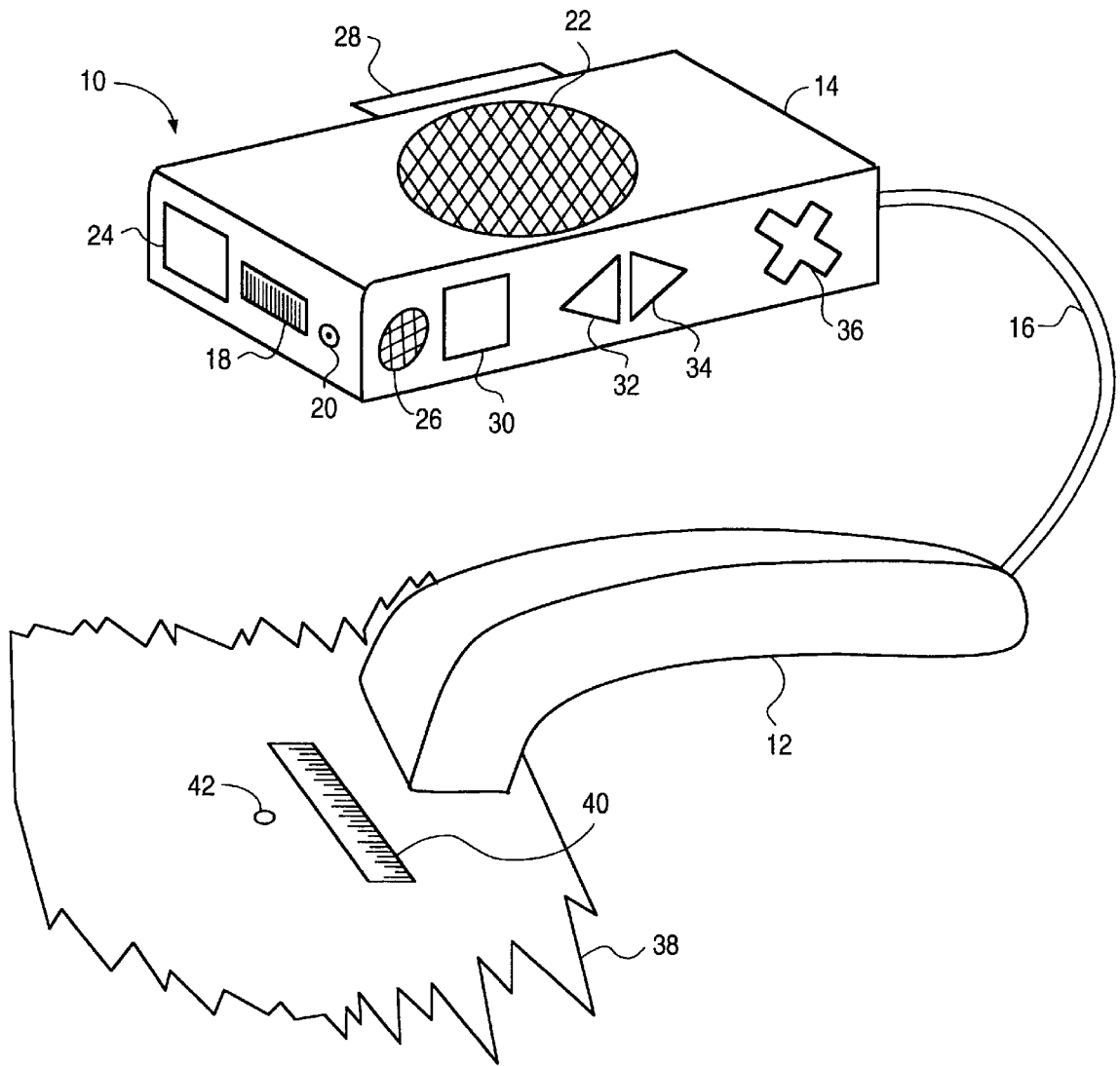
FIG. 1 is an oblique side view of the device showing the physical features of the device.

Referring now to the drawings, FIG. 1 depicts a portable scanning device having recording capabilities. While the examples in this disclosure are principally directed to an aid for assisting the visually impaired, those skilled in the arts will quickly realize that the device has broad application. A non-limiting example of a further use includes the identification and recording of information about wires or pipes found in dark or visually inaccessible places by tradesmen or construction workers. The device 10 consists of two major portions: scanner 12 and data processing unit 14. Scanner 12 is a hand held bar code scanner. Preferably, the scanner will automatically activate upon sensing a bar code and have the ability to automatically discriminate all standard bar codes. Suitable scanners include the 1021 CCD bar code scanner manufactured by Syntech Information Co., Ltd. of Taipei, Taiwan or the MS 6720 omnidirectional hand held scanner manufactured by Metro Logic Instruments, Inc. of Blackwood, N.J.

Scanner 12 is connected to data processing unit 14 by means of electrical wires 16. Alternatively, a cordless radio frequency or infrared connection may also connect scanner 12 and data processing unit 14 or both units could be in a single housing.

Data processing unit 14 houses among other features, the mechanical controls of device 10. A microphone and speaker (not shown) are located internally beneath grid 22. An on/off and volume control mechanism 18 powers up the unit and provides variable volume control for the user. Headphone jack 20, when activated by inserting a headphone connector plug (not shown) therein, redirects the audible output signal generated by device 10 from the speaker through headphone jack 20 into headphones. The device is by design portable and further designed to be clipped to a pocket or belt, or attached to a rope which can be used necklace style around the neck.

Data processing unit 14 has five operating modes. The I.D. mode is capable of reading a bar code and storing an associated recorded variable length object description into flash memory 28. A Memo mode allows the user to record, play, and erase data concerning an object or information not associated with bar codes. A Search mode allows the user to sequentially review all of the stored I.D. or bar code messages in the memory. A Memory mode reports the amount in minutes that remains on the currently used memory flash card. A Date/Time mode reports the current date and time. In addition, there is a sixth or Help mode which contains a recording describing how to use the device.

Operation of the device is preferably accomplished by mechanical commands. To access the various modes of operation and operate the device within each mode, the user depresses either a Mode button 24, a Record button 30, a Previous button 32, a Next button 34, or an Erase button 36. Preferably and as shown, these buttons have distinctive shapes and locations on the device 10 to facilitate use by the visually impaired.

Removable flash memory 28 records and stores both data read by scanner 12 and verbal data input into data processing unit 14.

To use device 10, to identify an object, object 38 must have a bar code 40. Many objects, for example, compact discs, already bear bar codes imprinted on them. In this instance, to consistently locate the bar code, a visually impaired individual would place or have placed for him a braille marker 42 on the object in a predetermined location near bar code 40. This will help the visually impaired individual locate bar code 40. In the event that a particular object 38 does not have a bar code, for example, clothing, a bar code may be affixed directly to the object or, alternatively, to a tag or similar attachment means, which, in turn, is affixed to the object. When affixing bar codes directly to an object, the bar code should also be of a sufficient thickness so that the visually impaired individual can detect its location. Thus, affixing new bar codes to objects may also be advantageous in circumstances where a particular object may already have an imprinted bar code, but that bar code cannot be detected with the tactile senses.

Figure 2:
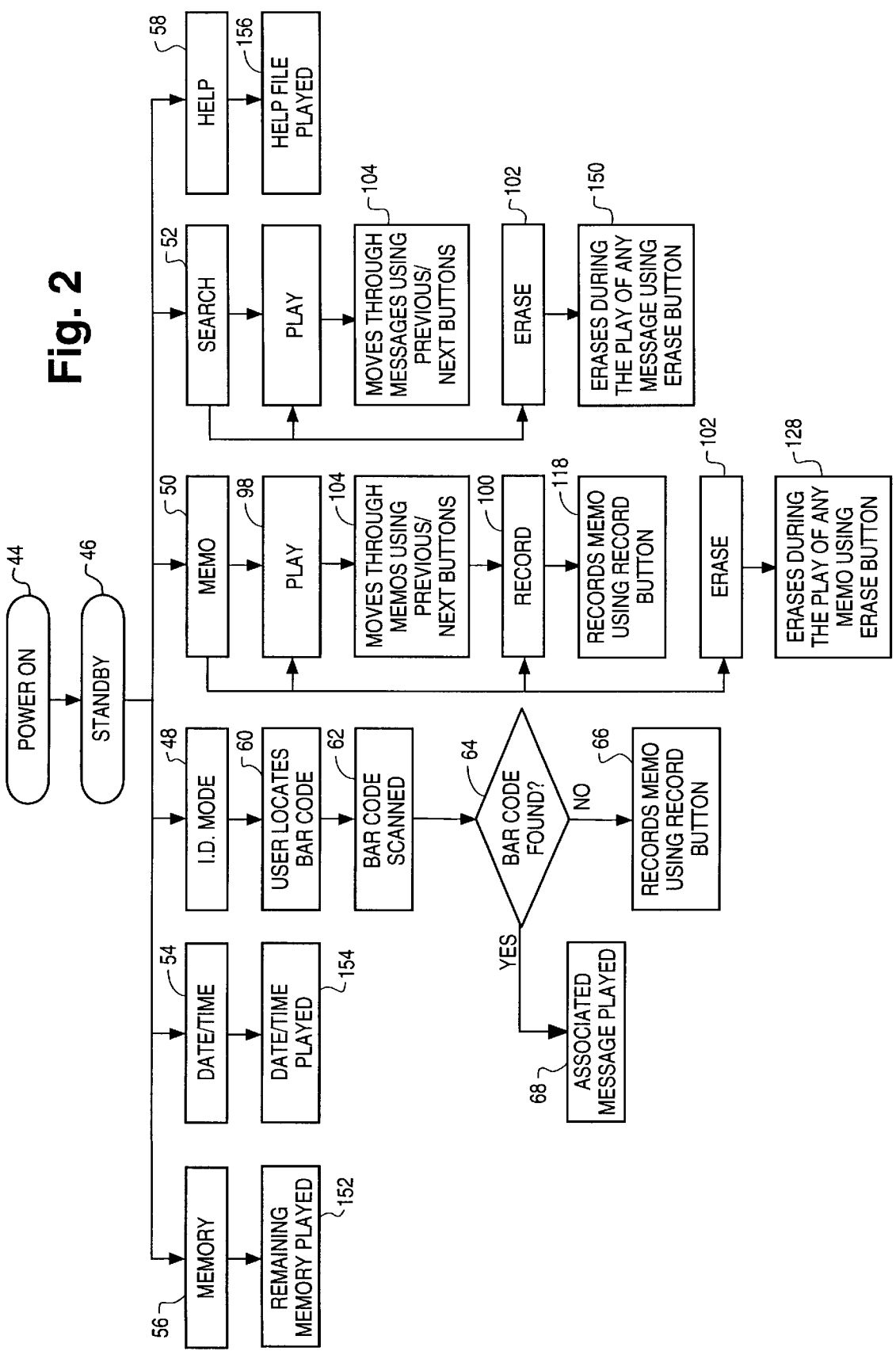
FIG. 2 is a flow chart which illustrates the function of each distinct mode of operation.

Turning to FIG. 2, a flow chart showing various modes of operation of device 10 are depicted. Once the on/off volume switch 18 (FIG. 1) is activated, the device is powered on at 46 and placed into I.D. mode 48. If Mode button 24 is not depressed, the system default is into I.D. mode 48. Alternatively, the Mode button 24 can be depressed one or more times to sequentially change the mode to either Memo 50, Search 52, Memory 56, Date/Time 54, or Help 58 modes. Continuous depression of Mode button could be used to cause continuous cycling through the modes if desired, with an audible output indicating each mode as it is actuated. In general, if the I.D. mode is selected, the user then locates a bar code on a particular object and the bar code is scanned. If the bar code is found in the existing memory of the device, the associated message is played. If no bar code is found, the user is audibly prompted to record a message by using the Record button 30. The device is preferably designed such that a response to the user for a particular scan is initiated within three seconds of completing the scan cycle.

Figure 3:
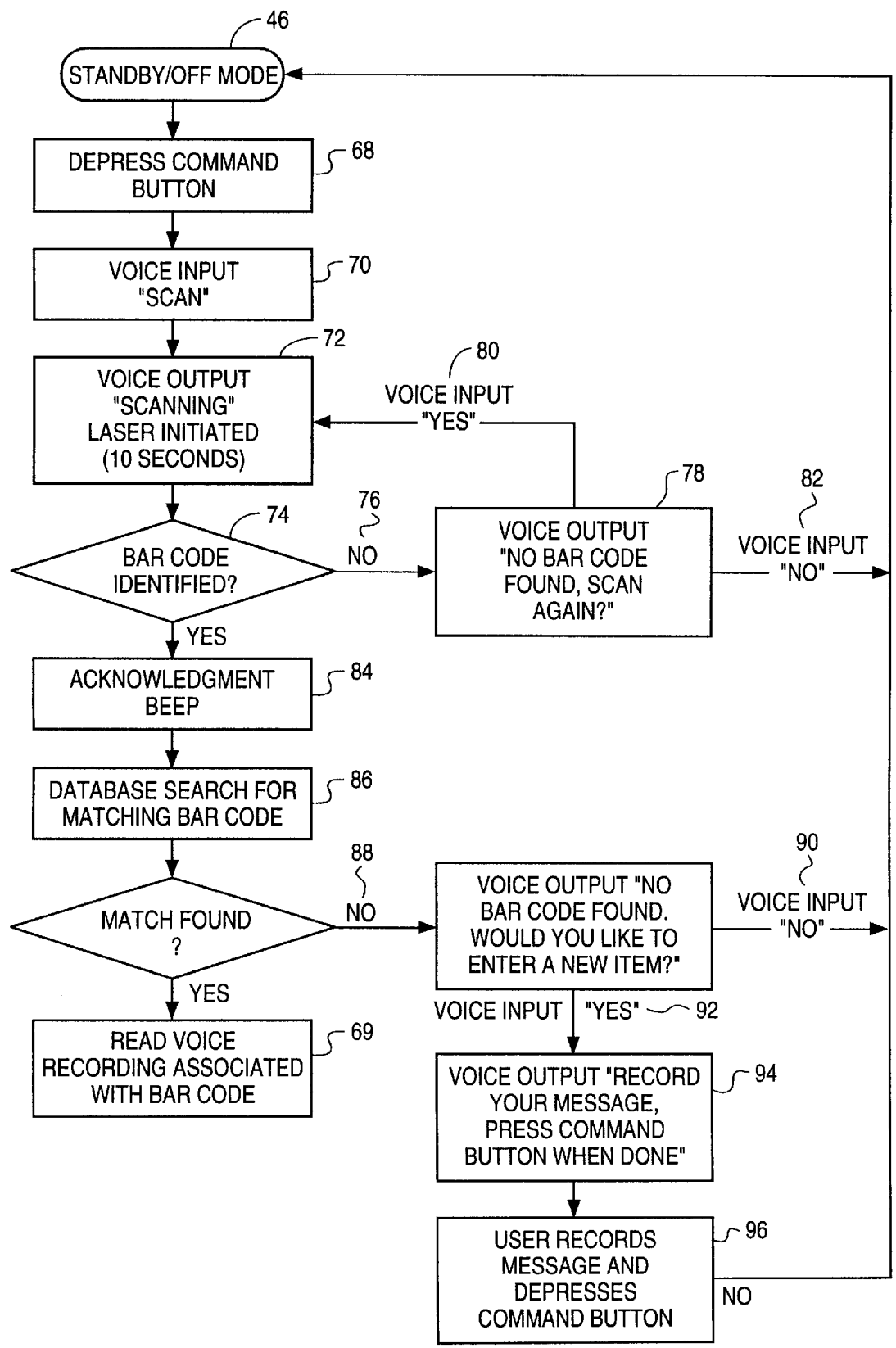
FIG. 3 is a flow chart which illustrates in detail the Identification mode of operation of the device.

Turning to FIG. 3, a more detailed flow chart illustrating the steps of the I.D. mode is depicted. From power on 46, the unit is already in default or I.D. mode 48. Once the user has identified the approximate location of the bar code, the bar code is scanned into Memory at 60. If a bar code is read by the scanner, an acknowledgment beep 62 will be relayed to the user. At that point, the device will begin a database search for a matching bar code within its memory at 64. A match is either found or not found at 65. If no match is found 66, the device then plays a prerecorded audible message to the user of "No bar code found" (or the equivalent). To record, press and hold Record button (or the equivalent) at 68. At block 70, if the Record button 30 is not pressed within a period of five seconds, an audible buzz 72 will be relayed to the user to indicate a return to the mode level 48. If the user does press and hold the Record button 30, recording begins at 74. The record cycle ends when the Record button 30 is released and the device plays the recorded message at 76 and returns to mode level 48.

Turning back to block 64, if a match is found, the device plays the associated voice recording from flash memory 78.

At block 80, if the Erase button is not depressed during the play of the voice recording or within five seconds after play, an audible buzz 72 will be relayed to the user to indicate a return to the mode level. If the Erase button 36 is depressed at 80, the device then generates a message to the user of "Press Erase button if you are sure you want to remove the following message" or the equivalent at 82. The message is replayed at block 84. At 86, if the user does not press the Erase button 36 during play or within five seconds, an audible buzz 72 is generated to indicate a return to mode level 48. If the user depresses the Erase button 36, the message and corresponding bar code are erased from memory at 88.

Returning to FIG. 2, the user may alternatively go from power on 46 to Search mode 52 by depressing the Mode button 24 until the device is in the Search mode. At Search 52, the user has two options: message play 102 or message erase 104. If the user chooses merely to play a message, the device moves through the recorded memos as the user presses the Previous button 32 or the Next button 34 (both shown in FIG. 1). The user can also erase any message and associated bar code by depressing the Erase button 36 during the play of the message at 102.

The user may also choose to go from power on 46 to Memo mode 50 by depressing the Mode button 24 until the device is in the Memo mode. In mode 50, the user has three options: memo play 106, memo record 108 or memo erase 110. If the user desires memo play, the device moves through recorded memos using the Previous button 32 and the Next button 34 (both shown in FIG. 1). To record a memo Record button 30 is depressed. To erase a memo, Erase button 36 is depressed while the memo is playing.

The user can also activate the Mode button 24 to select the Memory mode of operation at 56, in which case an audio signal is generated by the device informing the user of the remaining amount of available memory. The user may also select the Date/Time mode at 54, in which case the current date and time are played to the user. Finally, the user can select the Help mode at 58, in which case a help file is played at 156. The help file is approximately one minute long and upon its completion, the device returns to I.D. mode 46.

Alternatively to the mechanical command system described above, the device 10 can utilize a computer chip having the capability of speech recognition as a method of command. The speech recognition function of a chip like the RSC 164 manufactured by Sensory Circuits, Inc. of San Jose, Calif., has the capability of recognizing human voice commands and responding appropriately. With such a chip, some or all of the control buttons could be eliminated or the device could include the control buttons and respond to either type of command.

The device stores data in a removable compact flash memory having approximately forty minutes of recording time per flash memory card. Once a particular flash memory card is full, the user may remove it for storage and insert a new card. Each flash memory card must have the capability of audibly identifying its contents when inserted into the device. The digital recording provided by such a memory card is far superior to the recording of audible material on analog tape because access is faster and the device may be more compact.

The device is operated by a rechargeable battery source (not shown). Preferably, the battery has a life of four to six hours per charge, with device 10 having an audible low battery signal output when the batteries are near depletion. Alternatively, the device may operate off a standard 110 volt A.C. wall outlet by means of a transformer.

The above description of the preferred embodiment is for illustration purposes only. Those skilled in the arts will clearly see the additional advantages of the inventive device which should be limited only by the appended claims.

We claim:

1. A hand held object identifying device, comprising:
   scanning means for reading scannable code symbols;
   conversion means for converting scanned code symbols into an electrical signal unique to a particular code symbol;
   recording means for recording an identifying marker corresponding to the electrical signal for a particular code symbol;
   memory means for storing the code symbol electrical signals and corresponding identifying markers;
   search means for searching the memory to locate the particular identifying marker of a particular code symbol; and,
   audio means for displaying a particular identifying marker when a matching code symbol is located by the search means,
   whereby code symbols are read by the scanning means and converted into an electrical signal unique to the particular scanned code symbol, a search means then searches the memory to locate the corresponding identifying marker for the scanned code symbol, if a correlating identifying marker is located, the audio means plays back the recording of the identifying marker, and if no corresponding identifying marker is located by the search means, a user is prompted to record an identifying marker for the code symbol, the identifying marker being stored in the memory means.

2. The device according to claim 1 wherein the recording means further accepts audible messages not associated with a scannable code symbol.

3. A device according to claim 1 including means for collectively removing from the memory means of any of the scannable code symbols and corresponding identifying markers associated therewith.

4. A device according to claim 1, wherein each of said scannable code symbols is a bar code.

5. A device according to claim 1, wherein each of the identifying marker comprises spoken words.

6. A device according to claim 5, wherein each of identifying markers is digitally recorded.

7. A device according to claim 1 further comprising mechanically activated control means for controlling said scanning device.

8. A device according to claim 1, further comprising voice-activated control means for controlling said device.

9. A device according to claim 8, wherein said control means recognizes a plurality of different voice commands.

10. A hand held device to assist individuals to identify objects which are not visually perceptible, comprising:
    bar code means for sensing each of a plurality of distinctive symbols, each symbol associated with a unique object, the sensing means producing a distinctive electrical signal marker corresponding to each such symbol,
    voice prompt for producing a plurality of distinctive audible output signals associated with said electrical signals,
    memory means for recording each of said distinctive electrical signals and distinctive audible output signals,
    means to input said distinctive electrical signal to said memory means,
    audible output means for producing one of said distinctive audible output signals in response to sensing of the associated one of said distinctive symbols by said sensing means,
    audible output means for indicating that an electrical signal corresponding to a sensed symbol is not present in said memory means,
    input means for recording a distinctive electrical signal in said memory means and a distinctive audible output signal in association therewith, and deletion means for selectively removing from said memory means a selective one of said distinctive electrical signals and a distinctive audio output signal associated therewith.

11. A device according to claim 10 further comprising mechanically activated control means for/controlling said device.

12. A device according to claim 10 further comprising voice activated means for controlling said device.

13. A method for use by individuals to identify objects which are not visually perceptible comprising:

providing a unique bar code symbol to each of a plurality of objects to be identified, sequentially sensing each of said symbols, generating an electrical signal associated with each of said symbols, storing in memory means each electrical signal as a marker, and recording in said memory means an audible signal associated with each of said electrical signals.

14. The method of claim 13 further comprising the following steps:

selecting an object to be identified, sensing the bar code symbol associated with said object to be identified, generating a second electrical signal associated with said sensed symbol, storing in said memory said second electrical signal, comparing the stored first and second electrical signals, and producing the audible signal associated with said sensed symbol as a voice prompt to thereby identify said object if the first and second electrical signals correspond to each other.

15. The method according to claim 14, further including deletion of a previously recorded electrical signal and an associated previously recorded audible signal.

* * * * *